US009967498B2

(12) United States Patent  
Sambonsugi

(10) Patent No.: US 9,967,498 B2  
(45) Date of Patent: May 8, 2018

(54) IMAGE SENSOR AND IMAGE CAPTURING APPARATUS HAVING A PLURALITY OF STORAGE DEVICES

(71) Applicant: CANON KABUSHIKI KAISHA, Tokyo (JP)

(72) Inventor: Hideaki Sambonsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 14/482,305

(22) Filed: Sep. 10, 2014

(65) Prior Publication Data

US 2015/0077602 A1     Mar. 19, 2015

(30) Foreign Application Priority Data

Sep. 17, 2013     (JP) .................................. 2013-192369

(51) Int. Cl.
| | |
|---|---|
| H04N 5/378 | (2011.01) |
| H04N 5/232 | (2006.01) |
| H04N 5/374 | (2011.01) |
| H04N 5/3745 | (2011.01) |

(52) U.S. Cl.
CPC ......... *H04N 5/378* (2013.01); *H04N 5/23245* (2013.01); *H04N 5/374* (2013.01); *H04N 5/3742* (2013.01); *H04N 5/3745* (2013.01)

(58) Field of Classification Search
CPC ...................................................... H01L 24/17
USPC ................................................ 348/340, 296
See application file for complete search history.

(56) References Cited

U.S. PATENT DOCUMENTS

| | | | | |
|---|---|---|---|---|
| 5,585,652 A | * | 12/1996 | Kamasz | ............ H01L 27/14831 |
| | | | | 257/223 |
| 7,956,392 B2 | | 6/2011 | Uya | |
| 2006/0023109 A1 | * | 2/2006 | Mabuchi | ................. H01L 24/17 |
| | | | | 348/340 |
| 2008/0258042 A1 | * | 10/2008 | Krymski | ................ H04N 3/155 |
| | | | | 250/208.1 |
| 2008/0284888 A1 | * | 11/2008 | Kobayashi | ............. H04N 5/374 |
| | | | | 348/308 |
| 2008/0291290 A1 | * | 11/2008 | Sonoda | .................. H04N 5/361 |
| | | | | 348/222.1 |

(Continued)

FOREIGN PATENT DOCUMENTS

| | | |
|---|---|---|
| CN | 103296038 A | 9/2013 |
| JP | 2001-345441 A | 12/2001 |

(Continued)

OTHER PUBLICATIONS

The May 16, 2016 Korean Office Action that issued in Korean Patent Application No. 10-2014-0122645.

(Continued)

*Primary Examiner* — Joel Fosselman

(74) *Attorney, Agent, or Firm* — Cowan, Liebowitz & Latman, P.C.

(57) ABSTRACT

An image sensor comprises a first semiconductor substrate on which a plurality of photoelectric conversion elements are arranged, a second semiconductor substrate on which a plurality of storage devices each for storing pixel signals are arranged; and a plurality of connection units configured to electrically connect the photodiodes and the storage devices, wherein the plurality of storage devices are arranged in correspondence with the plurality of photoelectric conversion elements.

35 Claims, 11 Drawing Sheets

(56) References Cited

U.S. PATENT DOCUMENTS

2010/0238334 A1    9/2010  Takahashi
2013/0141620 A1*   6/2013  Nakajima .............. H04N 5/335
                                                        348/302

FOREIGN PATENT DOCUMENTS

| JP | 2008-042825   | 2/2008 |
| JP | 2013-106224   | 5/2013 |
| JP | 2013-165471 A | 8/2013 |

OTHER PUBLICATIONS

The May 8, 2017 Japanese Office Action that issued in Japanese Patent Application No. 2013192369.
The Mar. 17, 2017 Chinese Office Action that issued in Chinese Patent Application No. 201410469776.8.

* cited by examiner

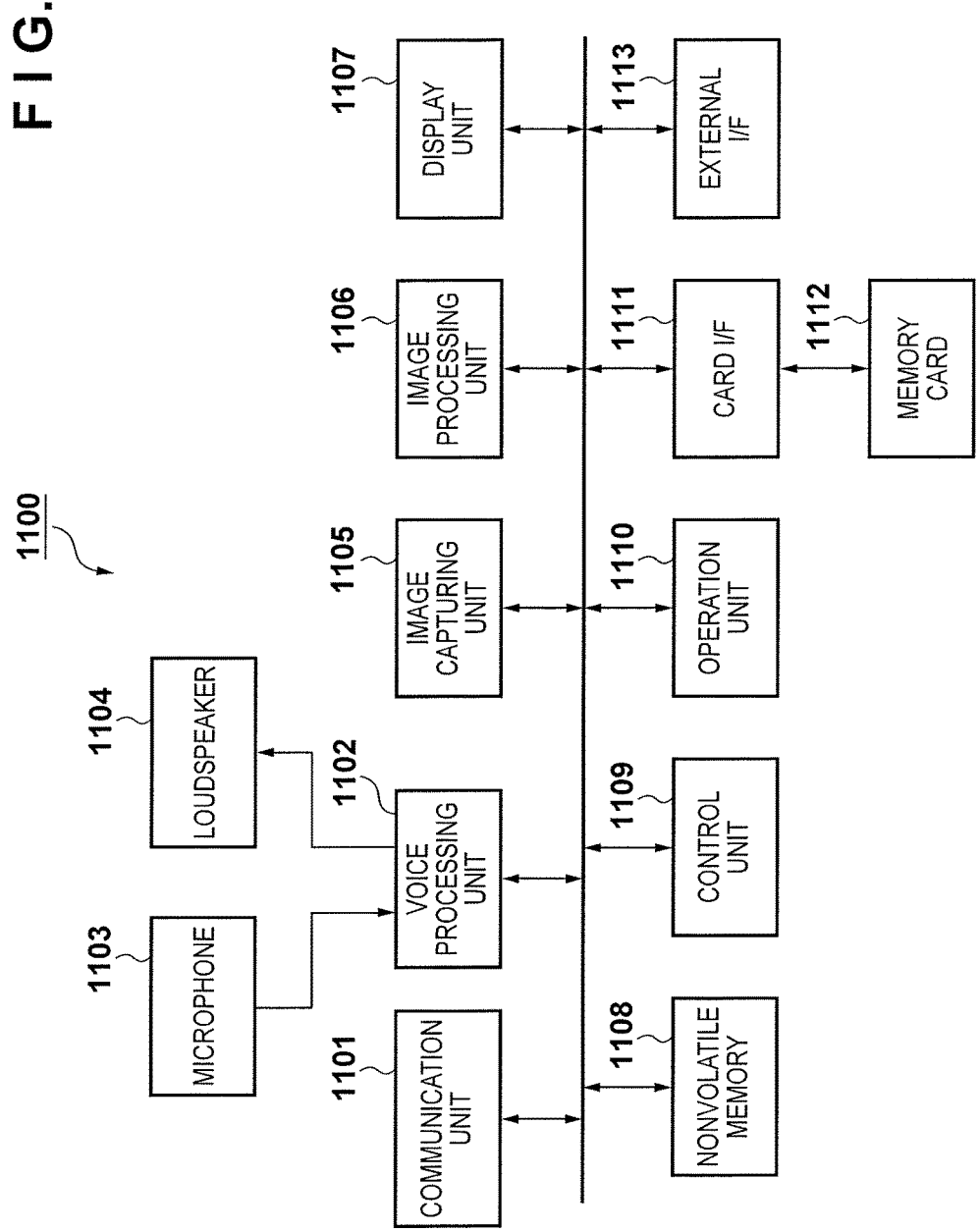

IMAGE SENSOR AND IMAGE CAPTURING APPARATUS HAVING A PLURALITY OF STORAGE DEVICES

BACKGROUND OF THE INVENTION

Field of the Invention

The present invention relates to an image sensor including a plurality of pixels arranged in a matrix, and an image capturing apparatus using the image sensor.

Description of the Related Art

There is conventionally known a technique of capturing images at a high frame rate by providing storage devices for each pixel, and sequentially storing continuously accumulated pixel signals in the storage devices without reading out the pixel signals outside an image sensor.

Japanese Patent Laid-Open No. 2001-345441 discloses a technique of capturing images at a high frame rate by providing a charge signal accumulation unit constituted by charge-coupled devices for each pixel, moving accumulated charges between the charge-coupled devices to sequentially store the charges, and reading them out.

In the conventional technique disclosed by the above-described Japanese Patent Laid-Open No. 2001-345441, however, the area of a pixel becomes large since many storage devices are provided for each pixel, and thus the number of pixels which can be arranged in a limited area becomes small, thereby degrading the image quality. Furthermore, if many storage devices are provided, the area of a photodiode becomes small, and the saturation characteristic and the like decrease, resulting in degradation in image quality.

SUMMARY OF THE INVENTION

The present invention has been made in consideration of the above-described problems, and provides an image sensor which allows image capturing at a high frame rate while maintaining the image quality, and an image capturing apparatus using the image sensor.

According to the first aspect of the present invention, there is provided an image sensor comprising: a first semiconductor substrate on which a plurality of photoelectric conversion elements are arranged; a second semiconductor substrate on which a plurality of storage devices each for storing pixel signals are arranged; and a plurality of connection units configured to electrically connect the photodiodes and the storage devices, wherein the plurality of storage devices are arranged in correspondence with the plurality of photoelectric conversion elements.

According to the second aspect of the present invention, there is provided an image capturing apparatus comprising: an image sensor defined above; and a selecting unit configured to select between a first mode in which the image sensor is caused to alternately perform generation of pixel signals and readout of the generated pixel signals and a second mode in which the image sensor is caused to generate pixel signals a plurality of times and then the plurality of generated pixel signals are read out.

According to the third aspect of the present invention, there is provided an image sensor comprising: a first semiconductor substrate on which a plurality of photoelectric conversion elements are arranged; a second semiconductor substrate on which a storage device for storing pixel signals is arranged; and a plurality of connection units configured to electrically connect the photodiodes and the storage device, wherein the storage device is connected to the plurality of photoelectric conversion elements.

According to the fourth aspect of the present invention, there is provided an image capturing apparatus comprising: an image sensor defined above; and a selecting unit configured to select between a first mode in which the image sensor is caused to alternately perform generation of pixel signals and readout of the generated pixel signals and a second mode in which the image sensor is caused to generate pixel signals a plurality of times and then the generated pixel signals are read out.

According to the fifth aspect of the present invention, there is provided an image sensor comprising: a first semiconductor substrate on which a photoelectric conversion element is arranged; a second semiconductor substrate on which a plurality of storage devices each for storing pixel signals are arranged; and a connection unit configured to electrically connect the photoelectric conversion element and the storage devices, wherein respective pixel signals accumulated by performing accumulation control a plurality of times by the photoelectric conversion element are separately stored in the plurality of storage devices.

According to the sixth aspect of the present invention, there is provided an image capturing apparatus comprising: an image sensor defined above; and a selecting unit configured to select between a first mode in which the image sensor is caused to alternately perform generation of pixel signals and readout of the generated pixel signals and a second mode in which the image sensor is caused to generate pixel signals a plurality of times and then the generated pixel signals are read out.

Further features of the present invention will become apparent from the following description of exemplary embodiments with reference to the attached drawings.

BRIEF DESCRIPTION OF THE DRAWINGS

FIG. 11 is a block diagram showing the arrangement of a mobile phone according to the third embodiment of the present invention.

DESCRIPTION OF THE EMBODIMENTS

Embodiments of the present invention will be described in detail below with reference to the accompanying drawings.

First Embodiment

Figure 1:
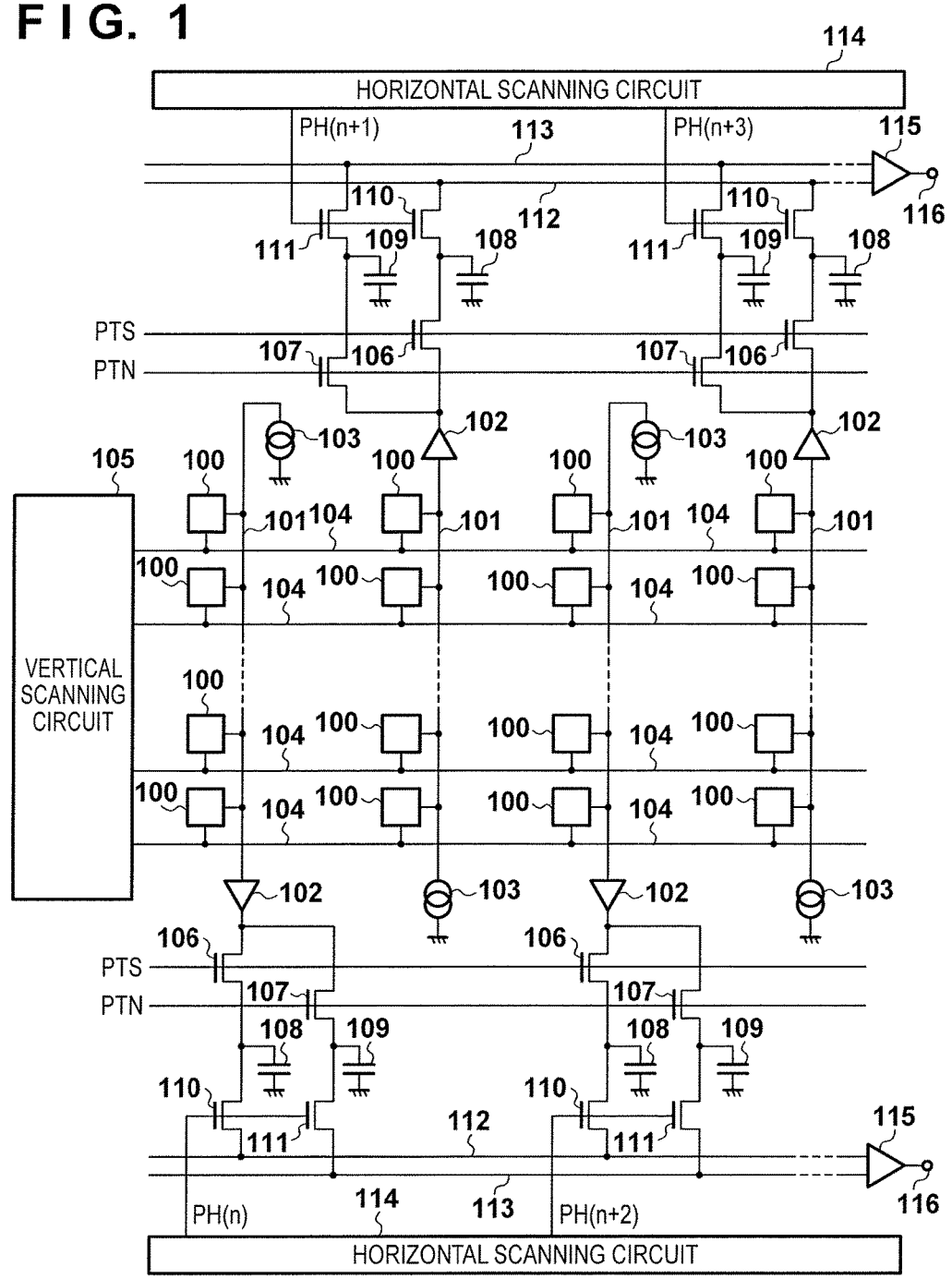
FIG. 1 is a circuit diagram showing the arrangement of an image sensor according to the first embodiment of the present invention.

FIG. 1 is a circuit diagram showing the arrangement of an image sensor according to the first embodiment of the present invention. Referring to FIG. 1, the effective pixel area of the image sensor is formed by arranging a plurality of pixel sets 100 in a matrix in the vertical direction (column direction) and the horizontal direction (row direction). Each pixel set 100 is connected to a control signal line 104 which receives a control signal from a vertical scanning circuit 105. Each pixel set 100 is also connected to a vertical output line 101 which extends through the image sensor and is adjacent to a pixel column. The vertical output line 101 has one end connected to a constant-current source 103, and the other end connected to a column amplifier (amplifier) 102. The output of the column amplifier 102 is connected to a holding capacitor 108 via a switch 106 driven by a control signal PTS. The holding capacitor 108 is connected to a horizontal output line 112 via a transfer switch 110 driven by a control signal PH for each column, which is output from a horizontal scanning circuit 114. The signal level of the pixel set 100 held in the holding capacitor 108 is output to the horizontal output line 112.

The output of the column amplifier 102 is also connected to a holding capacitor 109 via a switch 107 driven by a control signal PTN. The holding capacitor 109 is connected to a horizontal output line 113 via a transfer switch 111 driven by the control signal PH for each column, which is output from the horizontal scanning circuit 114. The dark level (reset level) of the pixel set 100 held in the holding capacitor 109 is output to the horizontal output line 113.

A readout amplifier 115 is connected to the horizontal output lines 112 and 113. The readout amplifier 115 receives the signal level of the pixel set 100 via the horizontal output line 112, and receives the dark level (reset level) of the pixel set 100 via the horizontal output line 113. The readout amplifier 115 outputs a signal obtained by multiplying the difference between the signal level and the dark level by a predetermined gain. The same operation is performed for the next column.

In this embodiment, there are two horizontal scanning circuits 114 each existing in the upper or lower portion of the image sensor, thereby simultaneously outputting signals for two columns. That is, the horizontal scanning circuits 114 sequentially operate so as to output pixel signals on the nth and (n+1)th columns and then output pixel signals on the (n+2)th and (n+3)th columns.

Figure 2:
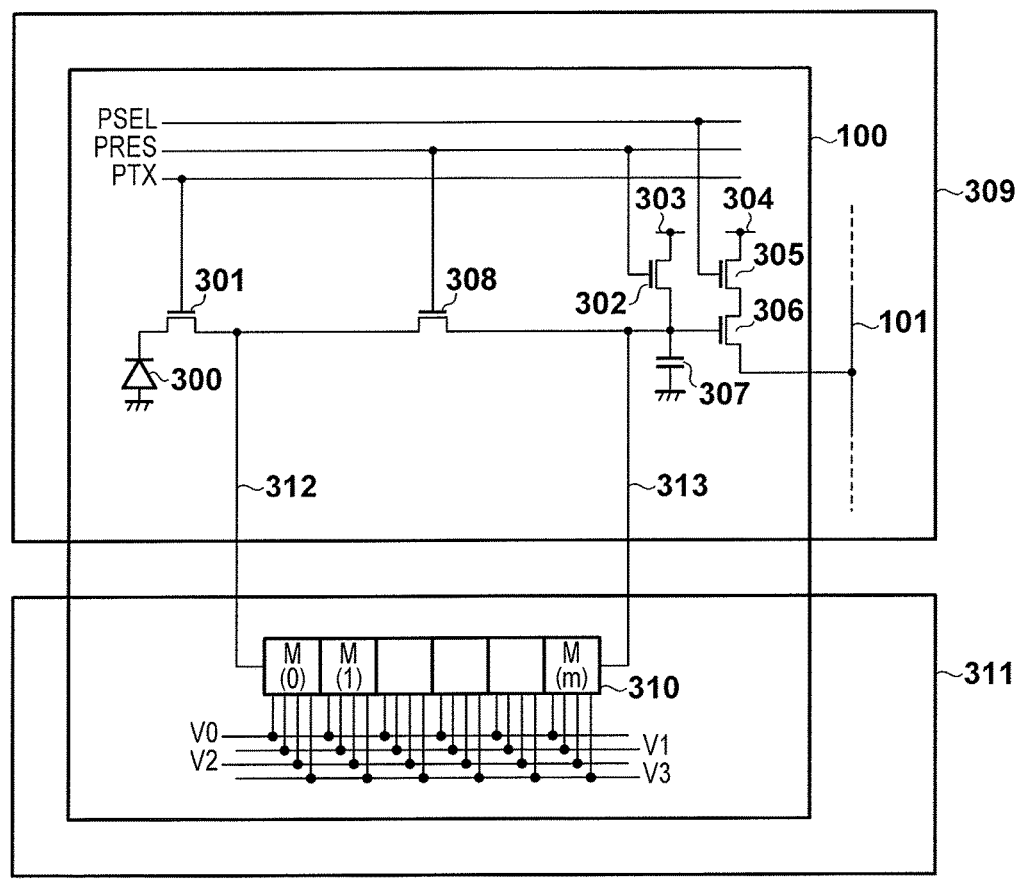
FIG. 2 is a circuit diagram showing the arrangement of a pixel set.

FIG. 2 is a circuit diagram showing the arrangement of the pixel set 100. A control signal PTX from the vertical scanning circuit 105 is input to the gate of a transfer switch 301 of the pixel set 100. A photodiode 300 is connected to the transfer switch 301 to which an FD (Floating Diffusion) 307 is connected via a connection switch 308. A control signal PRES from the vertical scanning circuit 105 is input to the gate of a reset switch 302. A control signal PSEL from the vertical scanning circuit 105 is input to the gate of a row selection switch 305. A pixel amplifier 306 is connected to the FD 307, and outputs a voltage signal corresponding to the charge amount of the FD 307.

A memory group 310 has an arrangement in which m unit memories M each for temporarily storing charges generated and accumulated in the photodiode 300 by photoelectric conversion are connected (a plurality of unit memories are arranged). The memory group 310 has one end connected to the transfer switch 301 via a connection line 312, and the other end connected to the FD 307 via a connection line 313. The memory group 310 is constituted by, for example, charge-coupled devices, and driving voltages V0, V1, V2, and V3 are applied to each unit memory. Note that although the memory group 310 as a storage device is constituted by the charge-coupled elements in this example, the present invention is not limited to this. Any arrangements for separately holding a plurality of charges, such as capacitors, are applicable.

Figure 3:
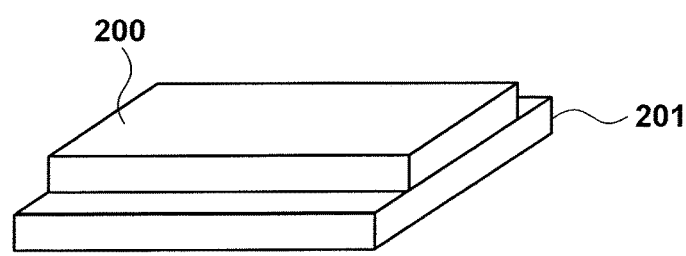
FIG. 3 is perspective view showing the arrangement of an image sensor.

FIG. 3 shows the arrangement of the image sensor. As shown in FIG. 3, the image sensor has an arrangement in which two substrates 200 and 201 as semiconductor substrates are bonded. The components surrounded by solid lines 309 in FIG. 2, that is, the circuit elements other than the memory group 310 are formed on the substrate 200. Similarly, the circuit elements other than the pixel sets 100 shown in FIG. 1 are also formed on the substrate 200. On the other hand, the memory group 310 and driving circuits (not shown) of the driving voltages V0, V1, V2, and V3, which are surrounded by solid lines 311 in FIG. 2, are formed on the substrate 201. The connection lines 312 and 313 are formed by microbumps or the like, and the substrates 200 and 201 are electrically connected for each pixel. With this arrangement, even if the area of the memory group 310 is large, it is possible to maintain the image quality such as the saturation characteristic and resolution without the need for reducing the area of the photodiode 300.

Figure 4A:
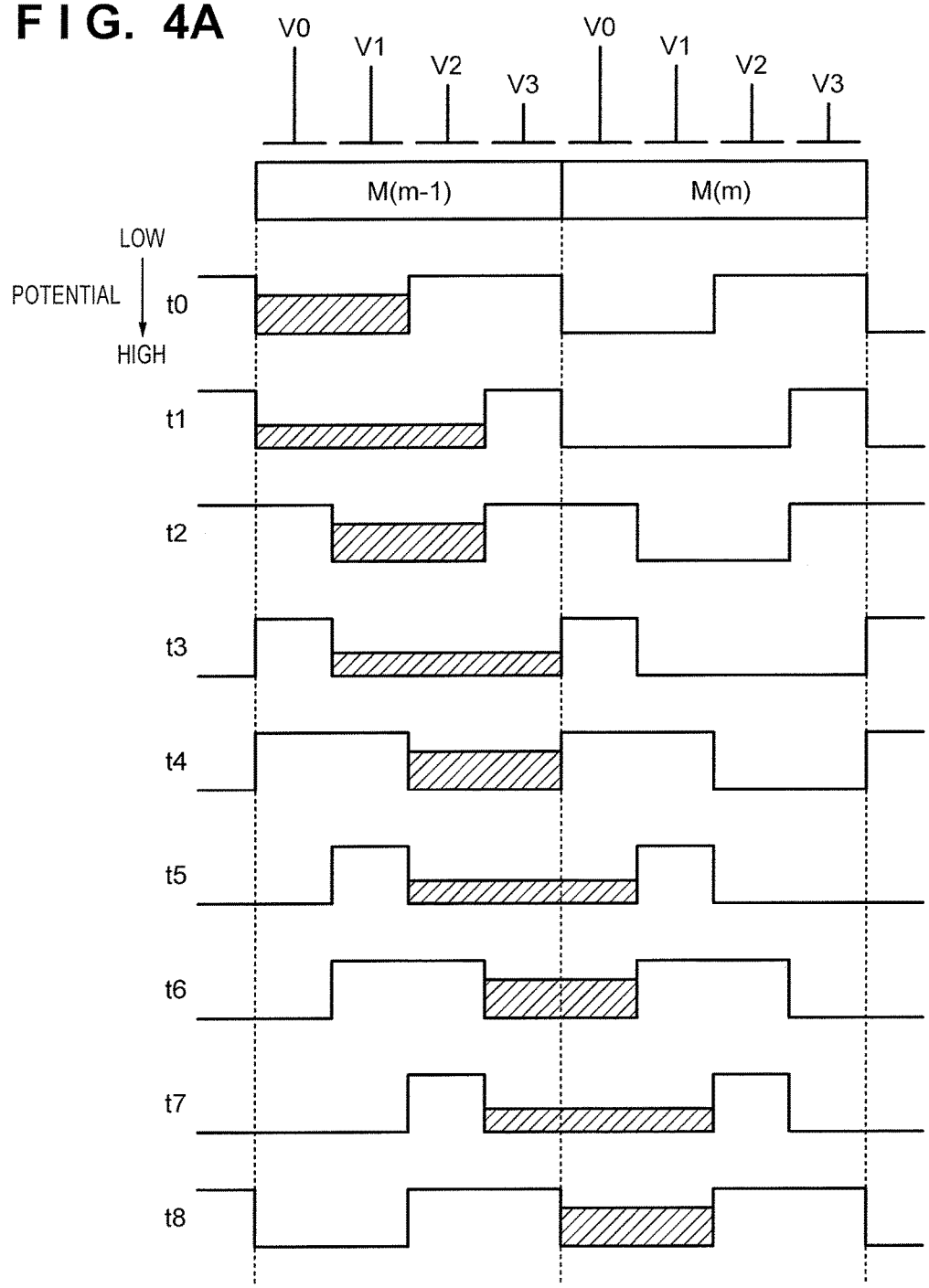
FIG. 4A is a view for explaining movement of charges in a memory group.
Figure 4B:
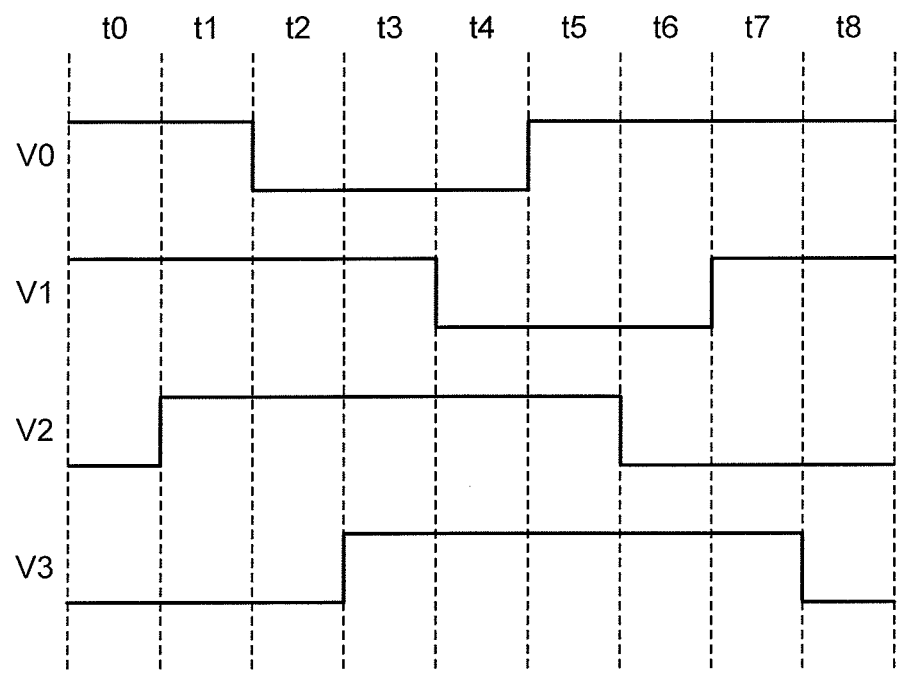
FIG. 4B is a timing chart for explaining movement of charges in the memory group.

FIGS. 4A and 4B are views for explaining movement of charges in the memory group 310. As shown in FIG. 4A, the driving voltages V0, V1, V2, and V3 are applied to each unit memory M. At time t0, the driving voltages V0 and V1 are applied. The potential of an area where the driving voltages V0 and V1 are applied lowers, and charges are stored in the area. When the driving voltage V2 is applied at time t1, the charges spread over a range where the driving voltages V0 to V2 are applied. After that, when application of the driving voltage V0 is stopped at time t2, the charges are stored in an area where the driving voltages V1 and V2 are applied, which means that the charges have moved by one electrode. If a similar operation is continuously performed from time t3 to time t8, as shown in FIG. 4B, the charges move by one unit memory. By repeating the operation from time t0 to time t8 m times, charges accumulated by performing an accumulation operation m times in the photodiode 300 (charges accumulated by performing accumulation control a plurality of times in the photodiode 300) are separately stored in unit memories M(1) to M(m).

Figure 5:
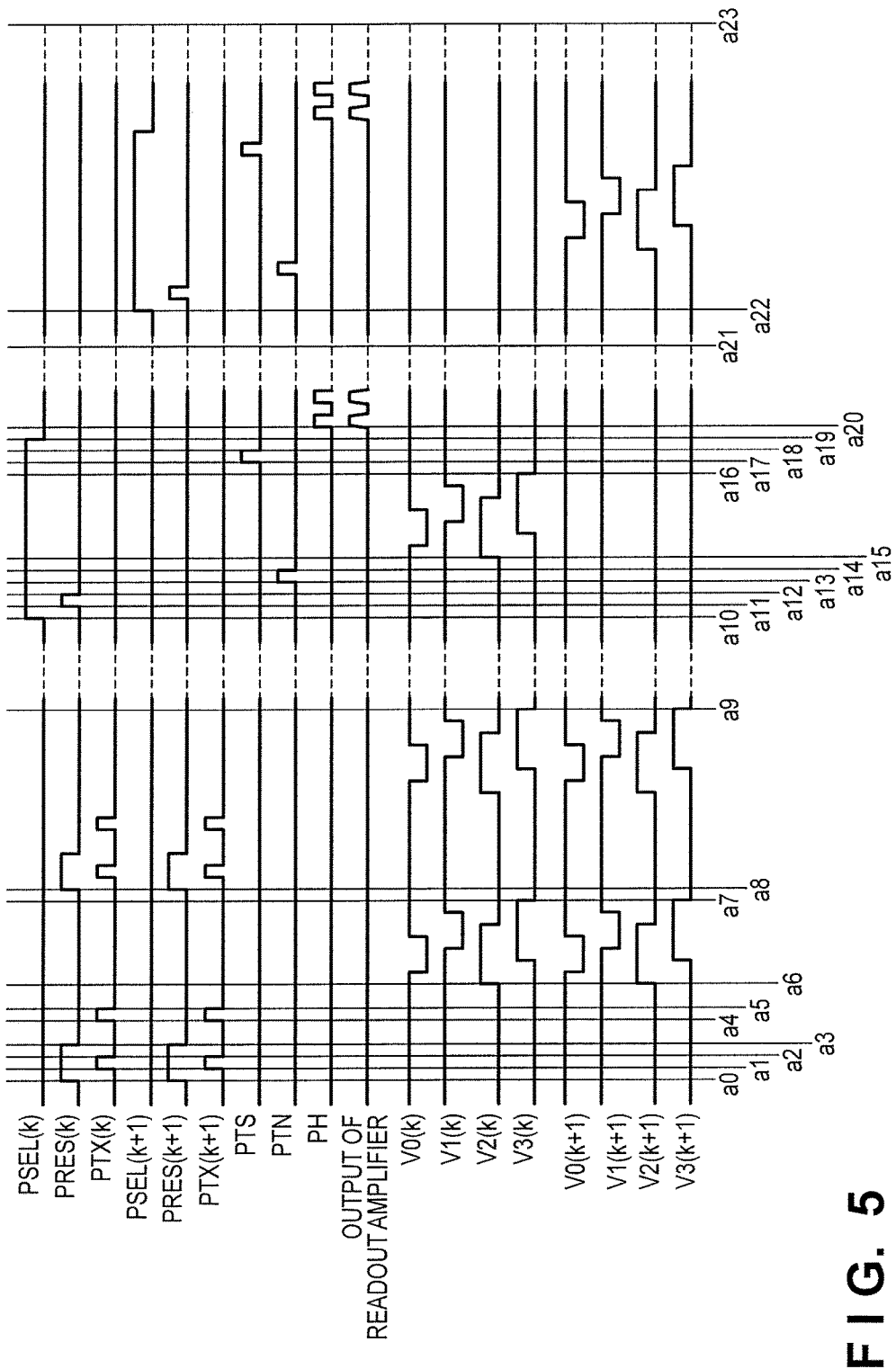
FIG. 5 is a timing chart for explaining the accumulation and readout operations of the image sensor.

FIG. 5 is a timing chart for explaining the accumulation and readout operations of the image sensor. Control signals for the pixel sets 100 arranged on the kth row are represented by PSEL(k), PRES(k), and PTX(k). The driving voltages of the pixel sets arranged on the kth row are presented by V0(k), V1(k), V2(k), and V3(k).

When the control signals PRES on all the rows are activated at time a0, the reset switches 302 of all the pixel sets 100 are turned on, thereby resetting the gates of the pixel amplifiers 306, that is, the FDs 307. During a period from time a1 to time a2, the control signals PTX on all the rows are activated. In this example, only the control signals on specific rows are shown. However, during this period, the control signals PTX on all the rows are activated, and the charges in the photodiodes 300 of all the pixel sets 100 are transferred to the gates of the pixel amplifiers 306 via the transfer switches 301 and connection switches 308, respectively. As a result, the photodiodes 300 are reset.

When the control signals PTX are negated at time a2, accumulation in the photodiodes 300 starts. After that, at time a3, the control signals PRES on all the rows are negated. By activating the control signals PTX on all the rows during a period from time a4 to time a5, the charges accumulated in each photodiode 300 are transferred to the unit memory M(0) of the memory group 310. This operation terminates accumulation, and thus a period from time a2 to time a5 is an accumulation period.

During a period from time a6 to time a7, the driving voltages V0, V1, V2, and V3 on all the rows are respectively driven at timings from time t0 to time t8 shown in FIG. 4B. This moves the charges from the unit memories M(0) to the unit memories M(1). With the above operation, pixel signals (charges) obtained by simultaneously exposing all the pixels are stored in the unit memories M(1) in the respective pixels. An operation from time a8 to time a9 is the same as that from time a0 to time a7. The charges accumulated in each photodiode 300 during the next accumulation time are stored in the unit memory M(1), and the charges accumulated in each photodiode 300 during the previous accumulation period are stored in the unit memory M(2). After that, the same operation is repeated during a period from time a9 to time a10, thereby performing the accumulation and storage operations m times in total. At time a10, pixel signals obtained by performing an accumulation operation (exposure operation) m times in each photodiode 300 are separately stored in the unit memories M(1) to M(m).

After time a10, an operation of sequentially reading out the charges on the respective rows stored in the memory groups 310 is performed. At time a10, the control signal PSEL(k) on the kth row is activated, thereby tuning on the row selection switches 305. Each source follower circuit constituted by the pixel amplifier 306 and the constant-current source 103 connected to the vertical output line 101 enters an operation state. When the control signal PRES(k) is activated at time a11, the reset switches 302 are turned on, and the gates of the pixel amplifiers 306, that is, the FDs 307 are initialized. That is, each vertical output line 101 receives a signal at the dark level (reset level) as a signal level immediately after the reset operation. After the control signal PRES(k) is negated at time a12, the control signal PTN is activated at time a13. This turns on the switch 107 connected to the output of the column amplifier 102 connected to each vertical output line 101, thereby holding the dark level in the holding capacitor 109.

After that, upon completion of the transfer operation at time a14, during a period from time a15 to time a16, the driving voltages V0(k), V1(k), V2(k), and V3(k) on the kth row are respectively driven at timings from time t0 to time t8 shown in FIG. 4B. With this operation, the charges which have been accumulated in the first operation, and are stored in each unit memory M(m) are transferred to the gate of the pixel amplifier 306, that is, the FD 307. The potential changes from the reset level by an amount corresponding to the signal charges transferred to each source follower constituted by the pixel amplifier 306, and thus the signal level is confirmed. At time a11, the control signal PTS is activated. This turns on the switch 106 connected to the output of the column amplifier 102 connected to each vertical output line 101, thereby holding the single level in the holding capacitor 108.

After that, when the control signal PTS is negated at time a18, the transfer operation is completed. With the above operation, the holding capacitors 108 and 109 respectively hold the signal level and dark level of a corresponding one of the pixel sets 100 on the kth row. Since the signals from the pixels have been output, the control signal PSEL (k) is negated at time a19.

At time a20, each horizontal scanning circuit 114 outputs the control signal PH to control the transfer switches 110 and 111, thereby performing an operation of connecting the holding capacitors 108 and 109 to the horizontal output lines 112 and 113, respectively. If a control signal PH(n) is activated, the holding capacitors 108 and 109 on the nth column are connected to the horizontal output lines 112 and 113 via the transfer switches 110 and 111, respectively. That is, signals accumulated in the pixel on the kth row and nth column are read out into the input of the readout amplifier 115. After that, all pixel signals on the respective columns such as the (n+1)th and (n+2)th columns are read out.

In the operation from time a10 to time a21, a readout operation for one row of the kth row is performed. During a period from time a22 to time a23, the same operation as that from time a10 to time a21 is performed for the (k+1)th row, thereby outputting signals on the (k+1)th row. After time a21, the above-described readout operation is performed for all the rows of the image sensor, thereby reading out the charges (the image signals of the first image) accumulated in all the pixels in the first operation. By repeating the operation after time a10 m times, all the charges (the image signals of m images) accumulated by performing an accumulation operation m times are read out.

With the above-described operation, it is possible to capture images at a high frame rate since when an accumulation operation is performed a plurality of times, continuously accumulated charges are held, and read out later, instead of reading out pixel signals for each accumulation operation. Furthermore, since the image sensor is constituted by the two semiconductor substrates and the photodiode and the memory for each pixel are formed on the different semiconductor substrates, it is possible to ensure the area of the photodiode, and improve the image quality.

Note that although one memory group is provided for each photodiode in this embodiment, the present invention is not limited to this. A memory group may be connected to a plurality of photodiodes via a switch. In this case, charges may be stored in only specific connected pixels (thinning-out), or charges in the respective photodiodes may be time-divisionally stored in the memory group.

Although the circuit elements except for the memory group 310 are formed on the substrate 200 in this embodiment, the present invention is not limited to this.

Second Embodiment

An image capturing apparatus according to the second embodiment of the present invention will be described below.

Figure 6:
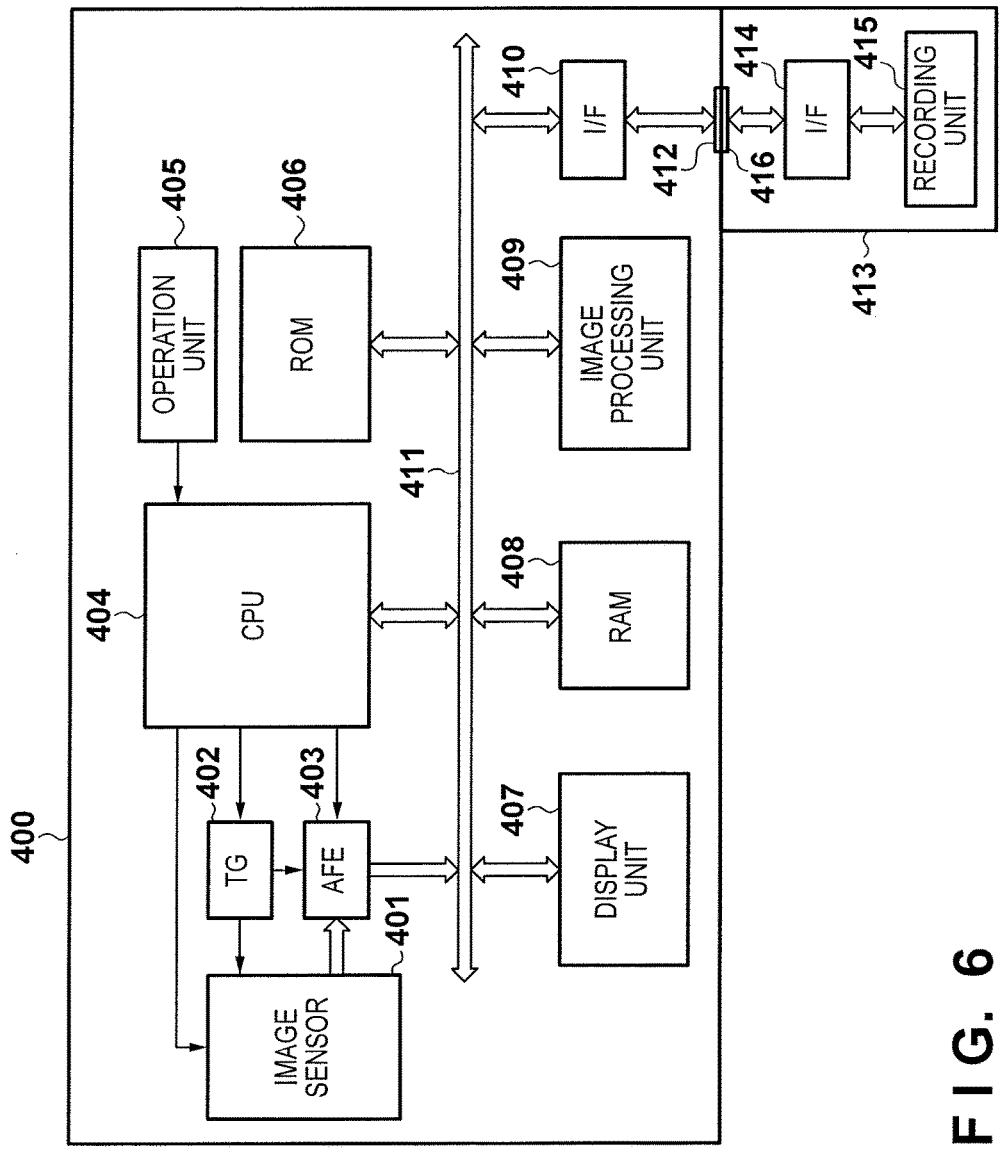
FIG. 6 is a block diagram showing the arrangement of an image capturing apparatus according to the second embodiment of the present invention.

FIG. 6 is a block diagram showing the arrangement of the image capturing apparatus according to the second embodiment of the present invention. In an image capturing apparatus 400 shown in FIG. 6, an image sensor 401 can capture images at a high frame rate by an arrangement (to be described later). An analog front end (to be referred to as an AFE hereinafter) 403 digitally converts an analog image signal output from the image sensor 401 in accordance with gain adjustment and a predetermined quantization bit. A timing generator (to be referred to as a TG hereinafter) 402 controls the driving timings of the image sensor 401 and the AFE 403.

A RAM 408 has both the function of an image data storage unit for storing the image data digitally converted by the AFE 403 and image data processed by an image processing unit 409 (to be described later), and the function of a work memory to be used when a CPU 404 (to be described later) operates. In this embodiment, these functions are implemented using the RAM 408. However, another memory is also applicable as long as the access speed of the memory is at a sufficient level.

A ROM 406 stores programs to be used when the CPU 404 (to be described later) operates. In this embodiment, a Flash-ROM is used. However, this is merely an example, and another memory is also applicable as long as the access speed of the memory is at a sufficient level.

The CPU 404 comprehensively controls the image capturing apparatus 400. The image processing unit 409 performs processing such as correction and compression of captured images. A connector 412 is connected to a connector 416 of an external recording medium 413 such as a nonvolatile memory or hard disk. An interface unit 410 communicates with an interface 414 of the connected external recording medium 413 to record still image data and moving image data in a recording unit 415 of the external recording medium 413. Note that in this embodiment, a detachable external recording medium is used as a recording medium. However, a nonvolatile memory, a hard disk, or the like in which data can be written may be incorporated.

When the user operates an operation unit 405, settings such as an image capturing instruction and image capturing conditions are made for the CPU 404. A display unit 407 displays captured still and moving images, menus, and the like.

Figure 7:
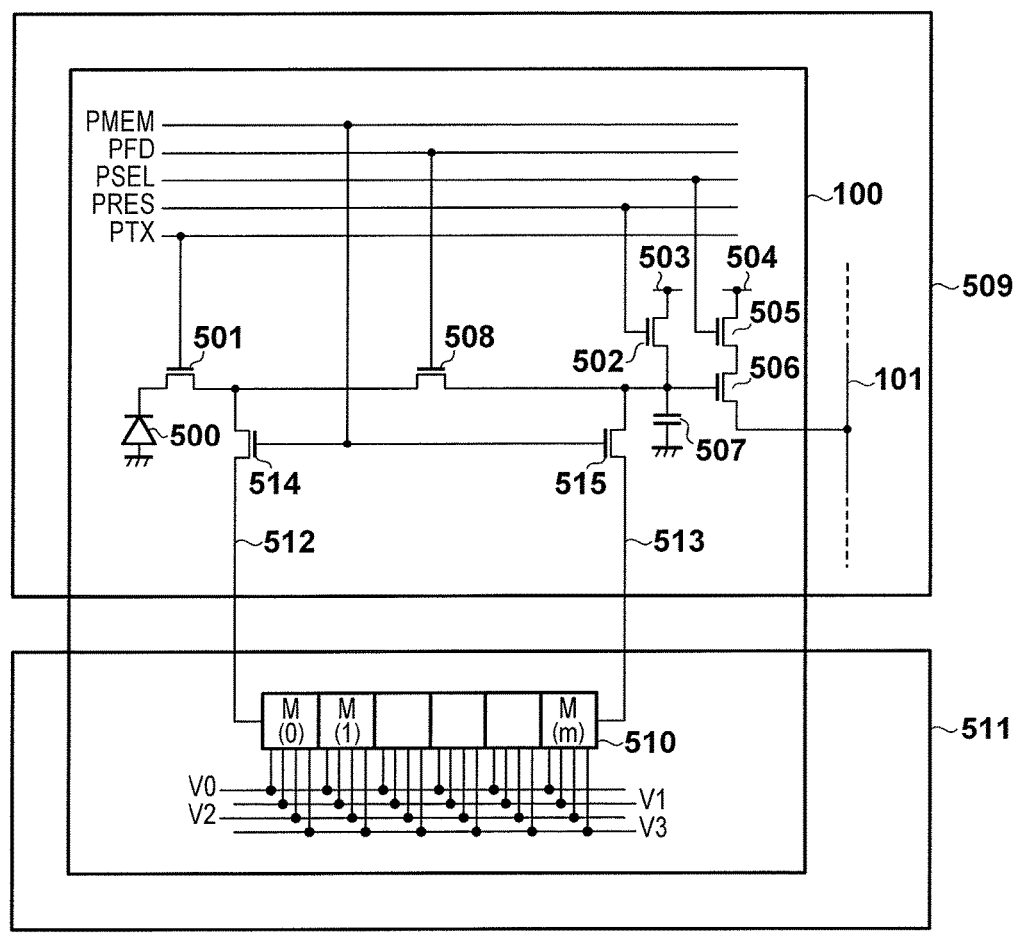
FIG. 7 is a circuit diagram showing the arrangement of a pixel set according to the second embodiment of the present invention.

The arrangement of the image sensor 401 will be described next. The arrangement of the image sensor 401 according to this embodiment is basically the same as that of the image sensor shown in FIG. 1 except for the arrangement of a pixel set 100. FIG. 7 shows the arrangement of the pixel set 100 according to this embodiment.

A control signal PTX from a vertical scanning circuit 105 is input to the gate of a transfer switch 501 of the pixel set 100. A photodiode 500 is connected to the transfer switch 501 to which an FD 507 is connected via a connection switch 508. The connection switch 508 is controlled by a control signal PFD. A control signal PRES from the vertical scanning circuit 105 is input to the gate of a reset switch 502. A control signal PSEL from the vertical scanning circuit 105 is input to the gate of a row selection switch 505. A pixel amplifier 506 is connected to the FD 507, and outputs a voltage signal corresponding to the charge amount of the FD 507.

A memory group 510 has an arrangement in which m unit memories M each for temporarily storing charges generated and accumulated in the photodiode 500 by photoelectric conversion are connected. The memory group 510 has one end connected to the transfer switch 501 via a connection line 512 and a switch 514, and the other end connected to the FD 507 via a connection line 513 and a switch 515. The memory group 510 is constituted by, for example, charge-coupled devices, and driving voltages V0, V1, V2, and V3 are applied to each unit memory. Note that although the memory group 510 as a storage device is constituted by charge-coupled elements in this example, the present invention is not limited to this. Any arrangements for separately holding a plurality of charges, such as capacitors, are applicable.

As shown in FIG. 3, the image sensor has an arrangement in which two substrates 200 and 201 as semiconductor substrates are bonded. The components surrounded by solid lines 509 in FIG. 7, that is, the circuit elements other than the memory group 510 are formed on the substrate 200. Similarly, the circuit elements other than the pixel sets 100 shown in FIG. 1 are also formed on the substrate 200. On the other hand, the memory group 510 and driving circuits (not shown) of the driving voltages V0, V1, V2, and V3, which are surrounded by solid lines 511 in FIG. 7, are formed on the substrate 201. The connection lines 512 and 513 are formed by microbumps or the like, and the substrates 200 and 201 are electrically connected for each pixel. With this arrangement, even if the area of the memory group 510 is large, it is possible to suppress degradation in saturation characteristic, resolution, and the like, and maintain the image quality, without the need for reducing the area of the photodiode 500.

Figure 8:
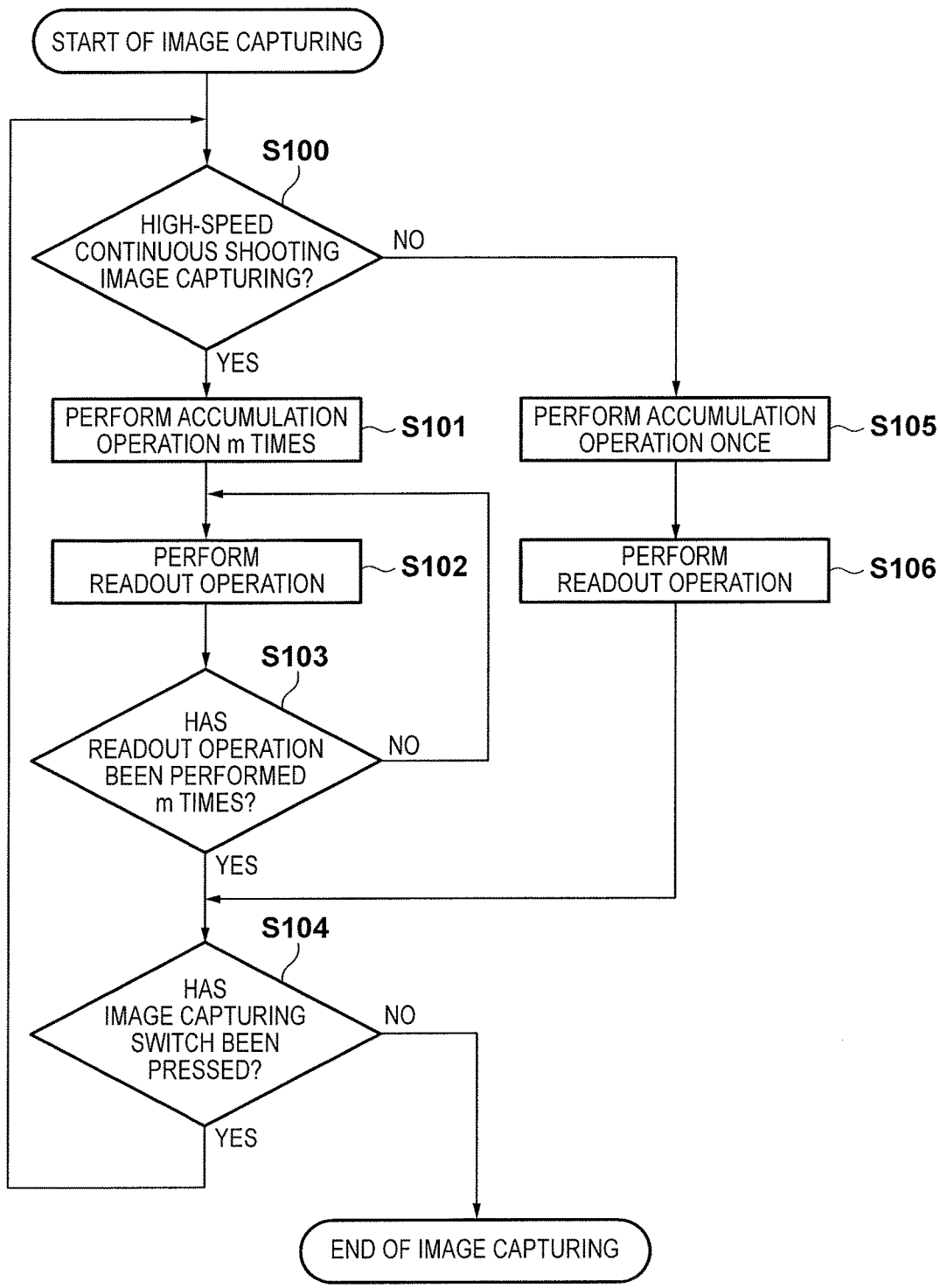
FIG. 8 is a flowchart illustrating the operation of the image capturing apparatus according to the second embodiment of the present invention.

FIG. 8 is a flowchart illustrating the operation of the image capturing apparatus 400 according to this embodiment. The operation of the image capturing apparatus 400 will be described with reference to FIG. 8.

When the user presses an image capturing switch included in the operation unit 405, an image capturing operation starts, and the process advances to step S100. In step S100, it is determined whether an image capturing mode set in advance is a high-speed continuous shooting mode. If the high-speed continuous shooting mode has been set, the process advances to step S101 to perform high-speed continuous shooting.

Figure 9:
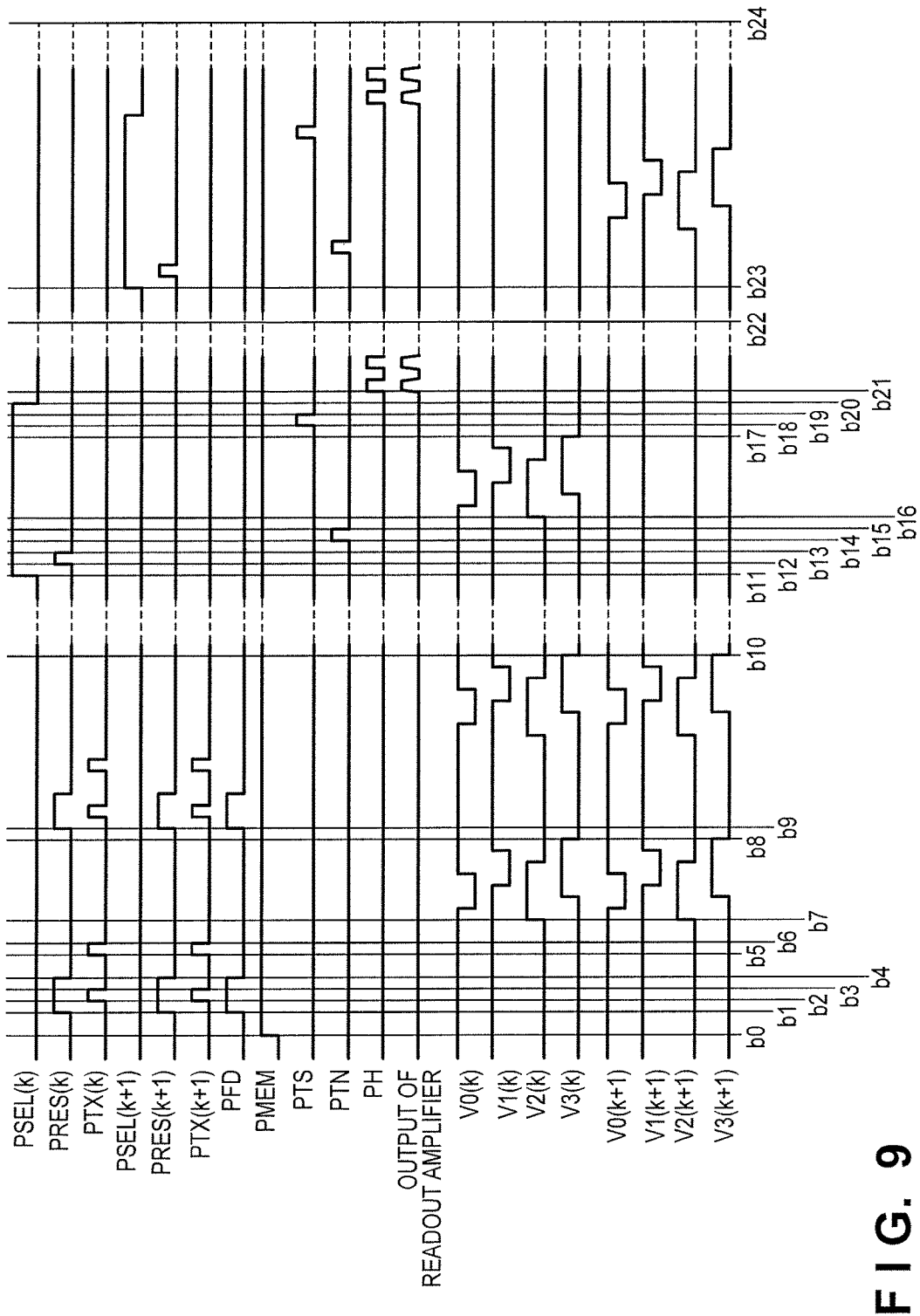
FIG. 9 is a timing chart showing the operation of an image sensor in a high-speed continuous shooting mode.

FIG. 9 shows the operation of the image sensor 401 in the high-speed continuous shooting mode. In the high-speed continuous shooting mode, the image sensor 401 continuously performs a charge accumulation operation a plurality of times, and reads out a voltage signal corresponding to charges temporarily stored in each memory group 510 (via each memory group 510). When a control signal PMEM is activated at time b0, the switches 514 and 515 are turned on, and thus each memory group 510 is connected to the transfer switch 501 and FD 507. When the control signals PRES and PFD on all the rows are activated at time b1, the reset switches 502 and connection switches 508 of all the pixel sets 100 are turned on, thereby resetting the gates of the pixel amplifiers 506, that is, the FDs 507. During a period from time b2 to time b3, the control signals PTX on all the rows are activated. Although FIG. 9 shows only the control signals on specific rows, the control signals PTX on all the rows are activated during this period, and charges in the photodiodes 500 of all the pixel sets are transferred to the gates of the pixel amplifiers 506 via the transfer switches 501 and the connection switches 508, respectively. As a result, the photodiodes 500 are reset.

When the control signals PTX are negated at time b3, accumulation in the photodiodes 500 starts. After that, at time b4, the control signals PRES on all the rows are negated. By activating the control signals PTX on all the rows during a period from time b5 to time b6, the charges accumulated in each photodiode 500 are transferred to a unit memory M(0) of the memory group 510. This operation terminates accumulation, and thus a period from time b3 to time b6 is an accumulation period.

During a period from time b7 to time b8, the driving voltages V0, V1, V2, and V3 on all the rows are respectively driven at timings from time t0 to time t8 shown in FIG. 4B.

This moves the charges from the unit memories M(0) to unit memories M(1). With the above operation, pixel signals (charges) obtained by simultaneously exposing all the pixels are stored in the unit memories M(1) in the respective pixels. An operation from time b9 to time b10 is the same as that from time b1 to time b8. The charges accumulated in each photodiode 500 during the next accumulation time are stored in the unit memory M(1), and the charges accumulated in each photodiode 500 during the previous accumulation period are stored in the unit memory M(2). After that, the same operation is repeated during a period from time b10 to time b11, thereby performing the accumulation and storage operations m times in total. At time b11, pixel signals obtained by performing an accumulation operation (exposure operation) m times in each photodiode 500 are separately stored in the unit memories M(1) to M(m).

Upon completion of accumulation, the process advances to step S102. In step S102, the pixel signals (charges) accumulated in the photodiodes 500 in step S101 and stored in the memory groups 510 are read out. After time b11 shown in FIG. 9, an operation of sequentially reading out the charges on the respective rows stored in the memory groups 510 is performed. At time b11, a control signal PSEL(k) on the kth row is activated, thereby tuning on the row selection switches 505. Each source follower circuit constituted by the pixel amplifier 506 and a current source 503 connected to the vertical output line 501 enters an operation state. When a control signal PRES(k) is activated at time b12, the reset switches 502 are turned on, and the gates of the pixel amplifiers 506, that is, the FDs 507 are initialized. That is, each vertical output line 101 receives a signal at the dark level (reset level) as a signal level immediately after the reset operation. After the control signal PRES(k) is negated at time b13, a control signal PTN is activated at time b14. This turns on a switch 107 connected to the output of a column amplifier 102 connected to each vertical output line 101, thereby holding the dark level in a holding capacitor 109.

After that, upon completion of the transfer operation at time b15, during a period from time b16 to time b17, driving voltages V0(k), V1(k), V2(k), and V3(k) on the kth row are respectively driven at timings from time t0 to time t8 shown in FIG. 4B. With this operation, the charges which have been accumulated in the first operation, and are stored in each unit memory M(m) are transferred to the gate of the pixel amplifier 506, that is, the FD 507. The potential changes from the reset level by an amount corresponding to the signal charges transferred to each source follower constituted by the pixel amplifier 506, and thus the signal level is confirmed. At time b18, a control signal PTS is activated. This turns on a switch 106 connected to the output of the column amplifier 102 connected to each vertical output line 101, thereby holding the single level in a holding capacitor 108.

After that, when the control signal PTS is negated at time b19, the transfer operation is completed. With the above operation, the holding capacitors 108 and 109 respectively hold the signal level and dark level of a corresponding one of the pixel sets 100 on the kth row. Since the signals from the pixels have been output, the control signal PSEL (k) is negated at time b20.

At time b21, each horizontal scanning circuit 114 outputs a control signal PH to control transfer switches 110 and 111, thereby performing an operation of connecting the holding capacitors 108 and 109 to horizontal output lines 112 and 113, respectively. When a control signal PH(n) is activated, the holding capacitors 108 and 109 on the nth column are connected to the horizontal output lines 112 and 113 via the transfer switches 110 and 111, respectively. That is, signals accumulated in the pixel on the kth row and nth column are read out into the input of a readout amplifier 115. After that, all pixel signals on the respective columns such as the (n+1)th and (n+2)th columns are read out.

In the operation from time b11 to time b22, a readout operation for one row of the kth row is performed. During a period from time b23 to time b24, the same operation as that from time b11 to time b22 is performed for the (k+1)th row, thereby outputting signals on the (k+1)th row. After time b22, the above-described readout operation is performed for all the rows of the image sensor, thereby reading out the charges (the image signals of the first image) accumulated in all the pixels in the first operation. The process advances to step S103.

In step S103, it is determined whether a readout operation has been performed m times (whether all the pixel signals accumulated by performing an accumulation operation m times have been read out). If the readout operation has not been performed m times, the process returns to step S102 to perform the readout operation; otherwise, the process advances to step S104.

In step S104, it is determined whether the image capturing switch included in the operation unit 405 has been pressed. If the switch has been pressed, the process returns to step S100; otherwise, the image capturing operation ends.

Figure 10:
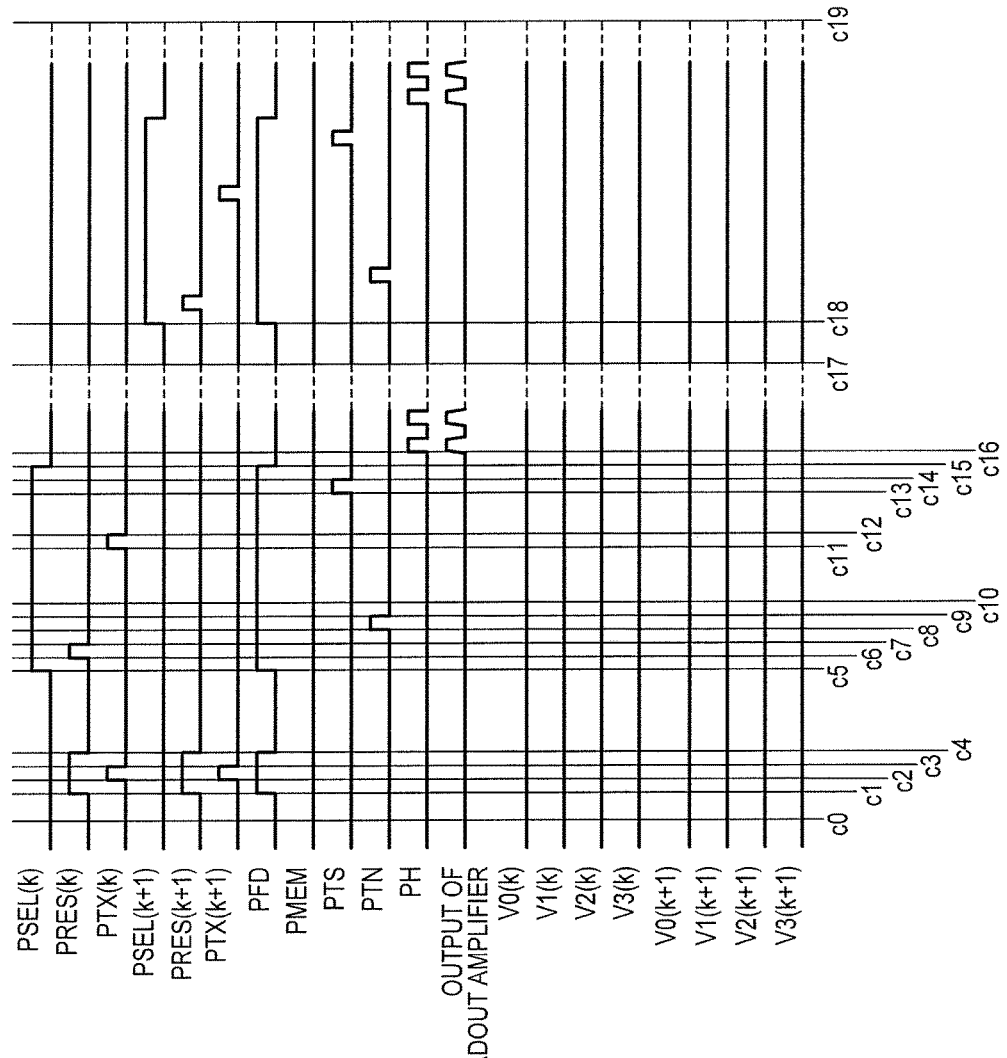
FIG. 10 is a timing chart showing the operation of the image sensor in a mode different from the high-speed continuous shooting mode.

If it is determined in step S100 that no high-speed continuous shooting mode has been selected, the process advances to step S105. FIG. 10 shows an operation when no high-speed continuous shooting mode has been selected. If no high-speed continuous shooting mode has been selected, an accumulation operation and a readout operation are alternately performed. When the control signal PMEM is negated at time c0, the switches 514 and 515 are turned off, and each memory group 510 is cut off from the transfer switch 501 and the FD 507. When the control signals PRES and PFD on all the rows are activated at time c1, the reset switches 502 and connection switches 508 of all the pixel sets 100 are turned on, thereby resetting the gates of the pixel amplifiers 506, that is, the FDs 507.

During a period from time c2 to time c3, the control signals PTX on all the rows are activated. Although FIG. 10 shows only the control signals on specific rows, the control signals PTX on all the rows are activated during this period, and charges in the photodiodes 500 of all the pixel sets are transferred to the gates of the pixel amplifiers 506 via the transfer switches 501 and the connection switches 508, respectively. As a result, the photodiodes 500 are reset. At time c3, the control signals PTX are negated. After that, at time c4, the control signals PRES on all the rows are negated. Then, during a period until time c5, a mechanical shutter mechanism (not shown) which is capable of opening/closing and is provided outside the image sensor 401 cuts off light emitted toward the image sensor 401. A period from time c3 until the mechanical shutter mechanism cuts off light is an accumulation period.

Upon completion of accumulation, the process advances to step S106. In step S106, the pixel signals (charges) accumulated in step S105 are read out. After time c5 shown in FIG. 10, an operation of sequentially reading out the charges stored on the respective rows is performed. At time c5, the control signal PSEL(k) on the kth row is activated, thereby turning on the row selection switches 505. Each source follower circuit constituted by the pixel amplifier 506 and the current source 503 connected to the vertical output line 501 enters an operation state. Furthermore, the control signal PFD is activated to turn on the connection switches 508, thereby connecting the transfer switches 501 and the FDs 507, respectively.

When the control signal PRES(k) is activated at time c6, the reset switches 502 are turned on, and the gates of the pixel amplifiers 506, that is, the FDs 507 are initialized. That is, each vertical output line 101 receives a signal at the dark level (reset level) as a signal level immediately after the reset operation. After the control signal PRES(k) is negated at time c7, the control signal PTN is activated at time c8. This turns on the switch 107 connected to the output of the column amplifier 102 connected to each vertical output line 101, thereby holding the dark level in the holding capacitor 109.

After that, upon completion of the transfer operation at time c9, during a period from time c11 to time c12, a control signal PTX(k) is activated. With this operation, the charges accumulated in each photodiode 500 are transferred. The potential changes from the reset level by an amount corresponding to the signal charges transferred to each source follower constituted by the pixel amplifier 506, and thus the signal level is confirmed. At time c13, the control signal PTS is activated. This turns on the switch 106 connected to the output of the column amplifier 102 connected to each vertical output line 101, thereby holding the single level in the holding capacitor 108. After that, when the control signal PTS is negated at time c14, the transfer operation is completed. With the above operation, the holding capacitors 108 and 109 respectively hold the signal level and dark level of a corresponding one of the pixel sets 100 on the kth row. Since the signals from the pixels have been output, the control signal PSEL (k) is negated at time c15. Furthermore, the control signal PFD is negated to turn off the switches 508, thereby cutting off the transfer switches 501 and the FDs 507.

At time c16, each horizontal scanning circuit 114 outputs a control signal PH to control the transfer switches 110 and 111, thereby performing an operation of connecting the holding capacitors 108 and 109 to the horizontal output lines 112 and 113, respectively. When the control signal PH(n) is activated, the holding capacitors 108 and 109 on the nth column are connected to the horizontal output lines 112 and 113 via the transfer switches 110 and 111, respectively. That is, signals accumulated in a pixel on the kth row and nth column are read out into the input of the readout amplifier 115. After that, all pixel signals on the respective columns such as the (n+1)th and (n+2)th columns are read out.

As described above, in the operation from time c5 to time c17, a readout operation for one row of the kth row is performed. During a period from time c18 to c19, the same operation as that from time c5 to time c17 is performed for the (k+1)th row, thereby outputting signals on the (k+1)th row. After time c19, the above-described readout operation is performed for all the rows of the image sensor, thereby reading out the charges (the image signals of the first image) accumulated in all the pixels. The process advances to step S104.

With the above-described operation, in the high-speed continuous shooting mode, it is possible to hold, in the memory group provided for each pixel, charges obtained by continuously performing an accumulation operation a plurality of times (generating a signal a plurality of times), and read out the charges later, instead of reading out the charges for each accumulation operation, thereby allowing image capturing at a high frame rate. In a mode different from the high-speed continuous shooting mode, since an accumulation operation and a readout operation are repeated, it is possible to continue an image capturing operation without depending on the memory capacity. Furthermore, since no memory is used, part or all of the power supply of the substrate can be turned off, thereby reducing the power.

Third Embodiment

FIG. 11 is a block diagram showing the arrangement of a mobile phone 1100 according to the third embodiment of the present invention. The mobile phone 1100 according to this embodiment has the email function, Internet connection function, image capturing function, image playback function, and the like, in addition to the voice communication function.

Referring to FIG. 11, a communication unit 1101 communicates voice data and image data with another mobile phone by a communication method complying with a communication carrier with which the user has made a contract. At the time of voice communication, a voice processing unit 1102 converts voice data from a microphone 1103 into a format suitable for a call, and sends the converted data to the communication unit 1101. The voice processing unit 1102 decodes voice data from a calling partner, which has been sent by the communication unit 1101, and sends the decoded data to a loudspeaker 1104.

An image capturing unit 1105 captures an image of an object, and outputs image data. The image capturing unit 1105 according to this embodiment includes the image sensor shown in FIG. 1, and each pixel set 100 of the image sensor has the same arrangement as that shown in FIG. 2 or 7. A description thereof will be omitted. Assume that the image capturing unit 1105 performs the same image capturing operation as that described in the first or second embodiment.

At the time of image capturing, an image processing unit 1106 processes the image data captured by the image capturing unit 1105, converts the image data into a format suitable for recording, and outputs the converted data. At the time of playing back the recorded image, the image processing unit 1106 processes the playback image, and sends the processed image to a display unit 1107. The display unit 1107 includes a liquid crystal display panel of about several inches, and displays various screens in response to an instruction from a control unit 1109. A nonvolatile memory 1108 stores data such as address book information, email data, and image data captured by the image capturing unit 1105.

The control unit 1109 includes a CPU and a memory, and controls the respective units of the mobile phone 1100 according to control programs stored in the memory (not shown). An operation unit 1110 includes a power button, number keys, and various operation keys used by the user to input data. A card I/F 1111 records and plays back various data for a memory card 1112. An external I/F 1113 transmits data stored in the nonvolatile memory 1108 or the memory card 1112 to an external device, and receives data transmitted by an external device. The external I/F 1113 performs communication by a well-known communication method such as a wired communication method like USB or a wireless communication method.

The voice communication function of the mobile phone 1100 will be described. To make a call to a communication partner, the user operates the number keys of the operation unit 1110 to input the number of the communication partner, or displays the address book stored in the nonvolatile memory 1108 on the display unit 1107, selects the communication partner, and instructs to make a call. When the user instructs to make a call, the control unit 1109 cause the communication unit 1101 to make a call to the communication partner. When the communication partner receives the call, the communication unit 1101 outputs voice data of the partner to the voice processing unit 1102, and also transmits voice data of the user to the partner.

To transmit email, the user instructs mail creation using the operation unit 1110. When the user instructs to create mail, the control unit 1109 displays a mail creation screen on the display unit 1107. The user inputs a transmission destination address and text using the operation unit 1110, and instructs transmission. When the user instructs mail transmission, the control unit 1109 sends address information and data of the mail text to the communication unit 1101. The communication unit 1101 converts the mail data into a format suitable for communication, and sends the converted data to the transmission destination. Upon receiving email, the communication unit 1101 converts data of the received mail into a format suitable for display, and displays the converted data on the display unit 1107.

The image capturing function of the mobile phone 1100 will be explained. When a still image capturing instruction or moving image capturing instruction is issued after the user sets an image capturing mode by operating the operation unit 1110, the image capturing unit 1105 captures still or moving image data, and sends the data to the image processing unit 1106. The image processing unit 1106 processes the captured still or moving image data, and stores the processed data in the nonvolatile memory 1108. The image processing unit 1106 sends the captured still or moving image data to the card I/F 1111. The card I/F 1111 stores the still or moving image data in the memory card 1112.

Furthermore, the mobile phone 1100 can transmit a file including the thus captured still or moving image data as a file attached to email. More specifically, when transmitting email, the user selects an image file stored in the nonvolatile memory 1108 or the memory card 1112, and instructs to transmit the selected file as an attached file.

The mobile phone 1100 can transmit a file including the captured still or moving image data to an external device such as a PC or another telephone via the external I/F 1113. The user operates the operation unit 1110 to select an image file stored in the nonvolatile memory 1108 or the memory card 1112 and instruct transmission. The control unit 1109 controls the external I/F 1113 to read out the selected image file from the nonvolatile memory 1108 or the memory card 1112, and to transmit the image file.

The preferred embodiments of the present invention have been described above. The present invention, however, is not limited to them, and various modifications and changes can be made within the scope and spirit of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-192369, filed Sep. 17, 2013, which is hereby incorporated by reference herein in its entirety.

What is claimed is:

1. An image capturing apparatus comprising:
   an image sensor which comprises a first semiconductor substrate on which a plurality of photoelectric conversion elements are arranged, a second semiconductor substrate on which a storage device for storing pixel signals is arranged, and a plurality of connectors which electrically connects the plurality of photoelectric conversion elements and the storage device; and
   a selector which selects between a first mode in which said image sensor is caused to alternately generate pixel signals and output the generated pixel signals and a second mode in which said image sensor is caused to generate pixel signals a plurality of times and output the generated pixel signals,
   wherein in the first mode, part or all of a power supply of said second semiconductor substrate is turned off.

2. The apparatus according to claim 1, further comprising a switch which switches between an operation of outputting, via the storage device, pixel signals generated by the photoelectric conversion elements and an operation of outputting the pixel signals without intervention of the storage device.

3. The apparatus according to claim 1, wherein each of said connectors is formed from a microbump.

4. The apparatus according to claim 1, wherein in the second mode, the storage device stores the generated pixel signals before outputting the pixel signals.

5. The apparatus according to claim 1, wherein said first semiconductor substrate and the second semiconductor substrate are stacked on each other.

6. An image sensor comprising:
   a first semiconductor substrate on which a plurality of photoelectric conversion elements are arranged;
   a second semiconductor substrate on which a plurality of groups of storage devices and a plurality of signal output portions each of which corresponds to each of the plurality of photoelectric conversion elements are arranged, each of the groups having a plurality of storage devices for storing pixel signals; and
   a plurality of connectors which electrically connect the photoelectric conversion elements and the storage devices,
   wherein each of the groups of storage devices is arranged in correspondence with a respective only one of the photoelectric conversion elements and connected between each of the photoelectric conversion elements and each of the signal output portions corresponding to each of the photoelectric conversion elements, and a number of the storage devices is larger than a number of the plurality of photoelectric conversion elements.

7. The sensor according to claim 6, wherein the signal output portion includes a floating diffusion portion.

8. The sensor according to claim 6, wherein the signal output portion includes a pixel amplifier portion.

9. The sensor according to claim 6,
   wherein respective pixel signals accumulated by performing accumulation control a plurality of times by the photoelectric conversion element are separately stored in the plurality of storage devices.

10. The sensor according to claim 9, wherein the respective pixel signals stored in the plurality of storage devices are separately output.

11. The sensor according to claim 6, wherein each of said connectors is formed from a microbump.

12. An image capturing apparatus comprising:
an image sensor defined in claim 6; and
a selector which selects between a first mode in which said image sensor is caused to alternately generate pixel signals and output the generated pixel signals and a second mode in which said image sensor is caused to generate pixel signals a plurality of times and output the generated pixel signals.

13. The apparatus according to claim 12, wherein in the first mode, part or all of a power supply of said second semiconductor substrate is turned off.

14. The apparatus according to claim 12, wherein in the second mode, the storage devices store the plurality of generated pixel signals before outputting the pixel signals.

15. The sensor according to claim 6, wherein said first semiconductor substrate and said second semiconductor substrate are stacked on each other.

16. An image sensor comprising:
a first semiconductor substrate on which a plurality of photoelectric conversion elements are arranged;
a second semiconductor substrate on which a plurality of groups of storage devices are arranged, each of the groups having a plurality of storage devices for storing pixel signals;
a plurality of connectors which electrically connect the photoelectric conversion elements and the storage devices; and
a plurality of switches each of which switches between an operation of outputting, via the storage devices, pixel signals respectively generated by the plurality of photoelectric conversion elements and an operation of outputting the pixel signals without intervention of the storage devices,
wherein each of the groups of storage devices is arranged in correspondence with a respective only one of the photoelectric conversion elements, and a number of the storage devices is larger than a number of the plurality of photoelectric conversion elements.

17. The sensor according to claim 16,
wherein respective pixel signals accumulated by performing accumulation control a plurality of times by the photoelectric conversion element are separately stored in the plurality of storage devices.

18. The sensor according to claim 17,
wherein the respective pixel signals stored in the plurality of storage devices are separately output.

19. The sensor according to claim 16, wherein said first semiconductor substrate and said second semiconductor substrate are stacked on each other.

20. The sensor according to claim 16, wherein each of said connectors is formed from a microbump.

21. An image capturing apparatus comprising:
an image sensor defined in claim 16; and
a selector which selects between a first mode in which said image sensor is caused to alternately generate pixel signals and output the generated pixel signals and a second mode in which said image sensor is caused to generate pixel signals a plurality of times and output the generated pixel signals.

22. The apparatus according to claim 21, wherein in the first mode, part or all of a power supply of said second semiconductor substrate is turned off.

23. The apparatus according to claim 21, wherein in the second mode, the storage devices store the plurality of generated pixel signals before outputting the pixel signals.

24. An image sensor comprising:
a first semiconductor substrate on which a plurality of photoelectric conversion elements are arranged;
a second semiconductor substrate on which a plurality of groups of storage devices are arranged, each of the groups having a plurality of storage devices for storing pixel signals; and
a plurality of connectors which electrically connect the photoelectric conversion elements and the storage devices,
wherein each of the groups of storage devices is arranged in correspondence with a respective only one of the photoelectric conversion elements, a number of the storage devices is larger than a number of the plurality of photoelectric conversion elements, and said first semiconductor substrate and said second semiconductor substrate are stacked on each other.

25. The sensor according to claim 24,
wherein respective pixel signals accumulated by performing accumulation control a plurality of times by the photoelectric conversion element are separately stored in the plurality of storage devices.

26. The sensor according to claim 25,
wherein the respective pixel signals stored in the plurality of storage devices are separately output.

27. The sensor according to claim 24, wherein each of said connectors is formed from a microbump.

28. An image capturing apparatus comprising:
an image sensor defined in claim 24; and
a selector which selects between a first mode in which said image sensor is caused to alternately generate pixel signals and output the generated pixel signals and a second mode in which said image sensor is caused to generate pixel signals a plurality of times and output the generated pixel signals.

29. The apparatus according to claim 28, wherein in the first mode, part or all of a power supply of said second semiconductor substrate is turned off.

30. The apparatus according to claim 28, wherein in the second mode, the storage devices store the plurality of generated pixel signals before outputting the pixel signals.

31. An image capturing apparatus comprising:
an image sensor which comprises a first semiconductor substrate on which a plurality of photoelectric conversion elements are arranged, a second semiconductor substrate on which a storage device for storing pixel signals is arranged, and a plurality of connectors which electrically connects the plurality of photoelectric conversion elements and the storage device; and
a selector which selects between a first mode in which said image sensor is caused to generate pixel signals and output the generated pixel signals without storing the generated pixel signals in the storage device and a second mode in which said image sensor is caused to generate pixel signals and store the generated pixel signals in the storage device before outputting the pixel signals,
wherein in the first mode, part or all of a power supply of said second semiconductor substrate is turned off.

32. The apparatus according to claim 31, further comprising a switch which switches between an operation of outputting, via the storage device, pixel signals generated by the photoelectric conversion elements and an operation of outputting the pixel signals without intervention of the storage device.

33. The apparatus according to claim 31, wherein a plurality of groups of storage devices are arranged on the second semiconductor substrate, each of the groups has a plurality of storage devices and is arranged in correspondence with a respective only one of the photoelectric conversion elements.

34. The apparatus according to claim 31, wherein said first semiconductor substrate and the second semiconductor substrate are stacked on each other.

35. The apparatus according to claim 31, wherein each of said connectors is formed from a microbump.

* * * * *